United States Patent [19]

Lang

[11] Patent Number: 4,845,557
[45] Date of Patent: Jul. 4, 1989

[54] FIELD MOTION SUPPRESSION IN INTERLACED VIDEO DISPLAYS

[75] Inventor: Stuart E. Lang, Montville, N.J.

[73] Assignee: Dubner Computer Systems, Inc., Paramus, N.J.

[21] Appl. No.: 189,088

[22] Filed: May 2, 1988

[51] Int. Cl.⁴ .......................... H04N 7/18; H04N 7/12
[52] U.S. Cl. ..................... 358/105; 358/135; 358/136
[58] Field of Search ........................ 358/105, 135, 136

[56] References Cited

U.S. PATENT DOCUMENTS

| | | | |
|---|---|---|---|
| 3,716,670 | 2/1973 | Lowry | 358/340 |
| 4,663,665 | 5/1987 | Tanaka et al. | 358/105 |
| 4,733,297 | 3/1988 | Katsumata et al. | 358/105 |
| 4,760,446 | 7/1988 | Ninomiya et al. | 358/105 |
| 4,768,092 | 8/1988 | Ushikawa | 358/105 |

*Primary Examiner*—Howard W. Britton
*Assistant Examiner*—John K. Peng
*Attorney, Agent, or Firm*—Francis I. Gray

[57] ABSTRACT

A field motion suppression technique in interlaced video displays produces a motion suppressed frame without the use of a fixed threshold for motion detection. One of two interlaced fields is selected to remain unchanged, and the other field is examined on a pixel by pixel basis using vertical pixels both above and below from both fields to determine motion for each pixel. When motion is detected for a pixel, the pixel value is replaced with an interpolated value from the unchanged field, otherwise the pixel value is left unchanged.

10 Claims, 3 Drawing Sheets

FIELD MOTION SUPPRESSION IN INTERLACED VIDEO DISPLAYS

BACKGROUND OF THE INVENTION

The present invention relates to motion suppression techniques in video systems, and more particularly to a field motion suppression technique in interlaced video displays which preserves vertical resolution of a resulting motion suppressed video frame.

In commercial television systems, such as NTSC and PAL, each video frame has two interlaced fields. If the lines within a frame are numbered sequentially from top to bottom, then the odd numbered lines are from the odd field and the even numbered lines are from the even field. If an object is moving rapidly, it may appear in different locations within each field. Certain devices, such as video cassette recorders, still stores, etc, are capable of "freezing" a single frame of a video signal. An object in motion within the picture represented by the single frame appears to flicker within two areas of the frame as the two interlaced fields are alternately displayed. An extreme illustration of this effect is shown in FIG. 1 where a stationary rectangular object and a moving ball are pictured. As the two fields are continuously redisplayed each of the images of the ball appears to flicker. What is desired is a display with the ball either in one position or the other.

A simple prior art solution is to simply pick one of the two fields and continuously redisplay it for both fields. For example if the odd field is chosen, then line 1 is displayed in alternate fields as lines 1 and 2, line 3 is displayed in alternate fields as lines 3 and 4, etc. This approach fills in the missing lines, but produces rather odd looking images because it tends to make the most well defined edges look jagged.

A better approach involves averaging. Assuming that the odd field is once again chosen for display, lines in the even field are produced by averaging. A pixel to be displayed on line 2 is obtained by averaging the pixel above on line 1 with the pixel below on line 3. This produces a more acceptable looking picture than the simple previous approach, but there is still a visible loss of vertical resolution.

In both of the above approaches vertical resolution is sacrificed within the entire picture image, even though most of the image may be stationary between the two fields. Ideally stationary objects within the image should not suffer a loss of vertical resolution along with those objects that are in motion.

Therefore what is desired is a method of detecting motion between the two consecutive fields selected to produce a video frame and change pixel values only where motion is detected to preserve vertical resolution for stationary objects.

SUMMARY OF THE INVENTION

Accordingly the present invention provides a field motion suppression technique in an interlaced video display which replaces pixels where motion is detected with an interpolated value. The pixels of the field to be replaced are each compared with the pixels immediately above and below in the same field to find a minimum difference within that field, and the pixels in the other field are compared to find a difference and an interpolated value. A difference between fields is obtained from the pixel value and the interpolated value. If the difference between fields is greater than both the internal field differences, then motion between fields is determined and the interpolated value is substituted for the pixel value. Otherwise the pixel is determined to be stationary and the pixel value is retained.

The objects, advantages and other novel features of the present invention are apparent from the following detailed description when read in conjunction with the appended claims and attached drawing.

DESCRIPTION OF THE PREFERRED EMBODIMENT

Figure 1:
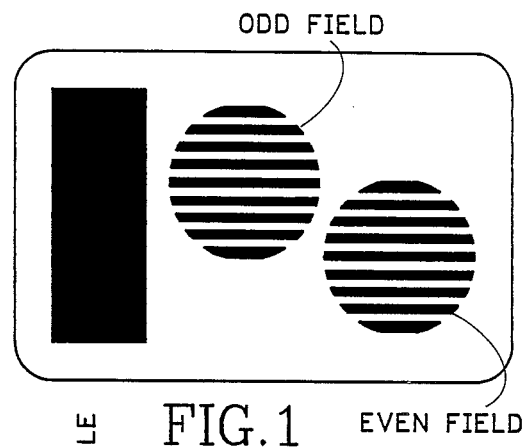
FIG. 1 is an illustration of flicker caused by a moving object within a still frame formed from two interlaced fields.
Figure 2A:
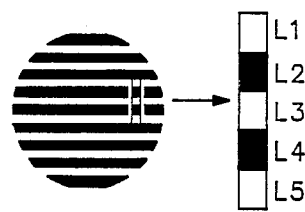
FIGS. 2(a)–2(g) illustrate the technique of motion suppression according to the present invention with respect to both a moving object and a stationary object.
Figure 2B:
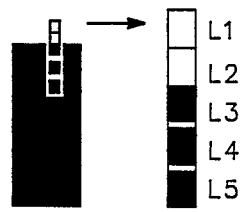

Referring now to FIGS. 2(a)–2(g) it is assumed that the even field is retained and the odd field is interpolated where there is motion. FIG. 2(a) illustrates the moving object of FIG. 1 where a determination is to be made for the value of the pixel from a middle line L3 from values for the corresponding pixel on lines above and below from the same and opposite fields, L1, L5 and L2, L4, and FIG. 2(b) illustrates the stationary object of FIG. 1 where a determination is to be made for the value of the pixel from a middle line L3 as for the moving object. With respect to the moving object lines 1, 3 and 5 are white (reverse image) while lines 2 and 4 are black, while for the stationary object lines 1 and 2 are white and lines 3–5 are black.

Figure 2C:
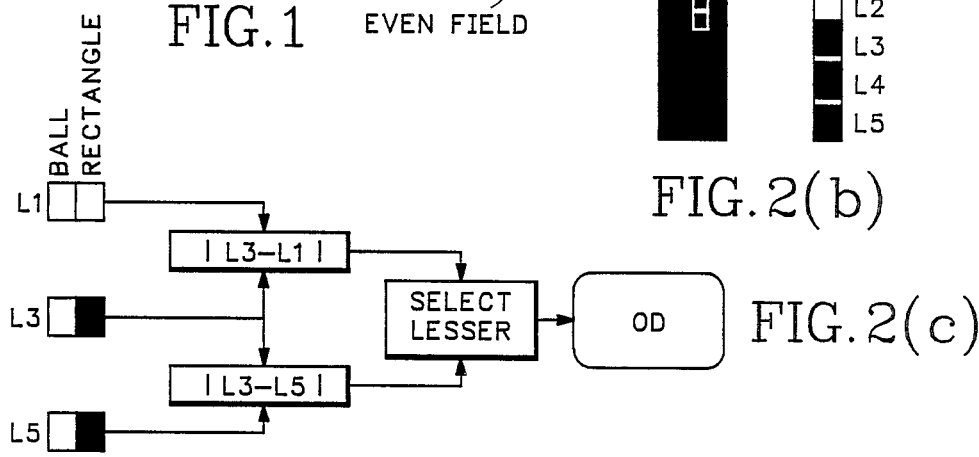
Figure 2D:
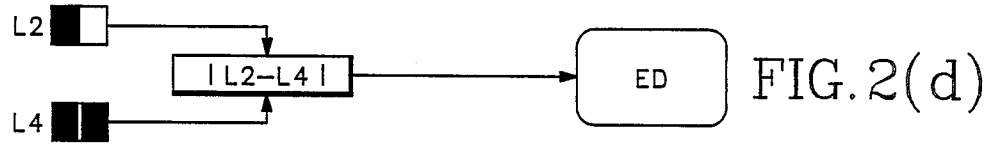
Figure 2E:

The first step of the motion suppression process is illustrated in FIG. 2(c) where the absolute value of the differences between the pixel from L3 and the pixels above and below from the same field, L1 and L5, are determined. The lesser of the absolute values is selected and identified as the odd difference value OD. For the moving ball both differences are zero and the value for OD is zero. For the rectangle one difference is zero while the other is 100, where white is 100 and black is zero in value, but the value for OD is still zero as being the lesser value. The next steps shown in FIGS. 2(d) and 2(e) use the pixels immediately above and below the pixel from L3 in the opposite field, i.e., corresponding pixels from lines L2 and L4. The absolute value of the difference between the pixels of L2 and L4 is determined and identified as the even difference value ED, and the average of the pixels from lines L2 and 14 is determined and identified as an interpolated alternative pixel value AP. For the ball AP is black, or zero, while for the rectangle AP is intermediate between white and black, or 50.

Figure 2F:
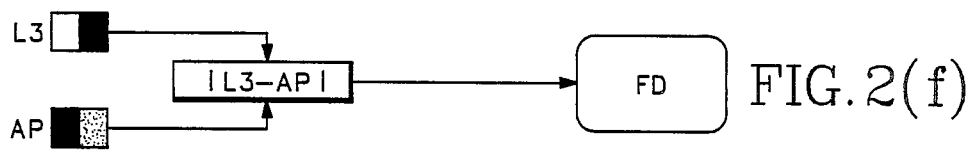
Figure 2G:
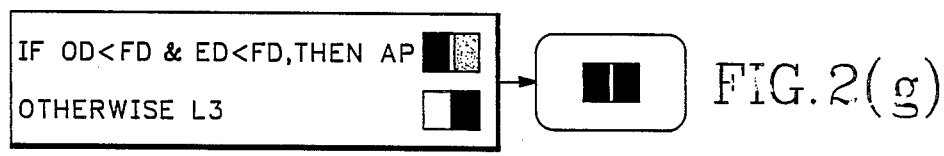

As shown in FIG. 2(f) a field difference value FD is determined from the absolute difference between the pixel value from L3 and the alternate value AP. For the ball FD is 100, while for the rectangle FD is 50. With the respective values for OD, ED and FD motion with respect to the pixel L3 is determined. If both OD and ED are less than FD, then motion is detected for the pixel of L3 and the alternate pixel value AP is used in lieu of the value of the L3 pixel. For the ball the values of OD and ED are zero which is less than the value of FD which is 100. Therefore the value of the pixel of L3 is replaced with the value of AP which corresponds to black, filling in the ball. For the rectangle the value of OD is less than the value of FD, but the value of ED is greater than the value of FD. Therefore there is no motion and the value of the pixel from L3 is retained.

A significant feature of the above-described technique is that, contrary to previous motion detection schemes, no fixed thresholds are used. The data effectively sets its own thresholds for motion detection on a pixel by pixel basis. The technique is equally applicable to chrominance values as it is to luminance values. In systems having color components, such as YIQ and YUV systems common in NTSC and pAL television systems, the technique is applied independently to the luminance and chrominance of each pixel and, where motion is detected in either or both luminance and chrominance channels, both luminance and chrominance AP values are substituted. For RGB both the luminance and chrominance may be considered simultaneously by processing the green channel which contains most of the luminance information, substituting the AP values in all three RGB signals when motion is detected in the green signal.

Figure 3:
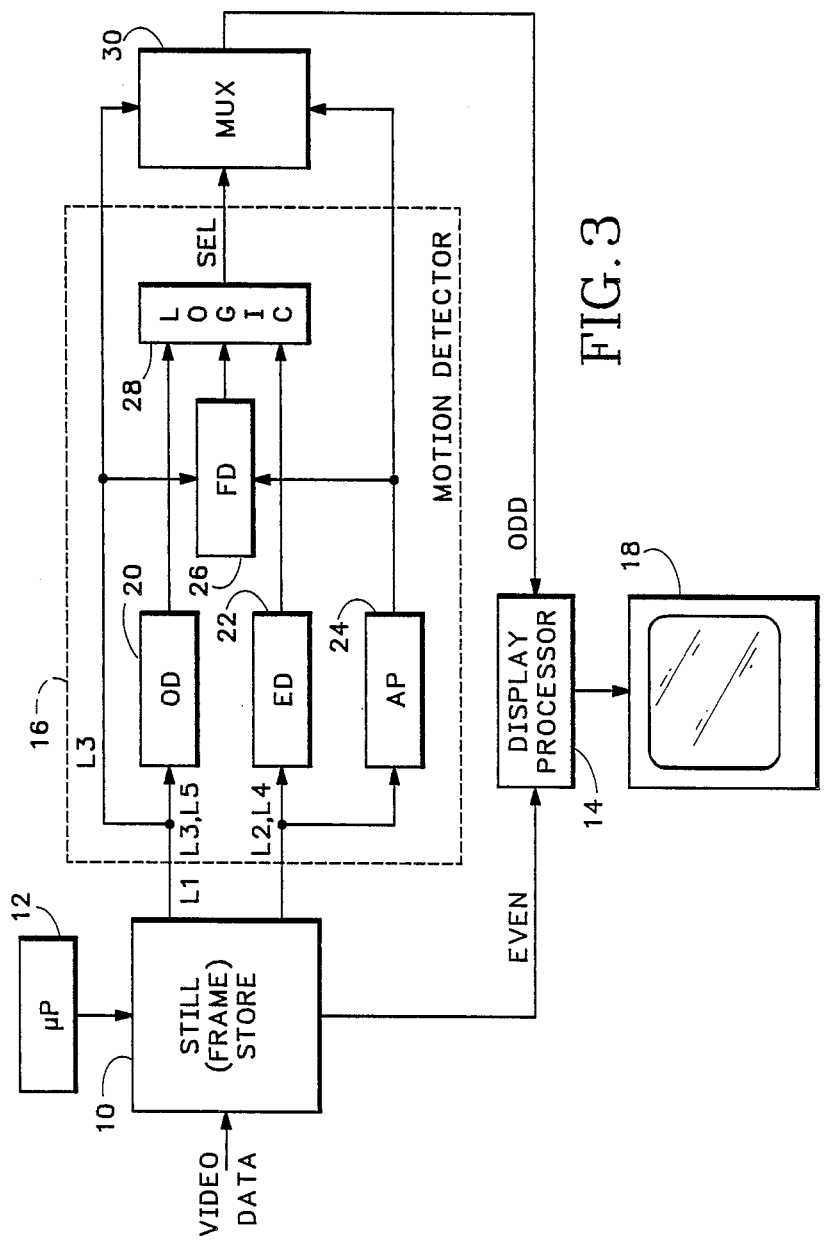
FIG. 3 is a block diagram of a system using the field motion suppression technique of the present invention.

The technique may be implemented in computer software, in digital hardware for real time processing or in analog hardware. For example as shown in FIG. 3 an input video data signal is stored in a still, or frame, store 10 under control of a microprocessor 12. The even field of the video data signal is output to a display processor 14. The display processor 14 combines the even field with the odd field as processed by a motion detector 16 for display on an appropriate monitor 18. For each pixel L3 of the odd field to be processed, pixels L1, L5 and L2, L4 immediately above and below that pixel from both fields are also output from the still store 10. These five pixels are input to the motion detector circuit 16. Pixels L1, L3, L5 are input to an odd difference circuit 20 while pixels L2, L4 are input to an even difference circuit 22 and an alternative pixel circuit 24. A field difference circuit 26 has as inputs the pixel L3 and the output of the alternative pixel circuit 24. The outputs of the odd, even and field difference circuits 20, 22, 26 are input to a logic circuit 28 which outputs a select signal depending upon whether motion is detected for the pixel L3. The select signal from the logic circuit 28 is input to a multiplexer 30 together with the pixel L3 and the output of the alternative pixel circuit 24. The output of the multiplexer 30 is a series of pixel values that make up the modified odd field for input to the display processor 14.

Figure 4:
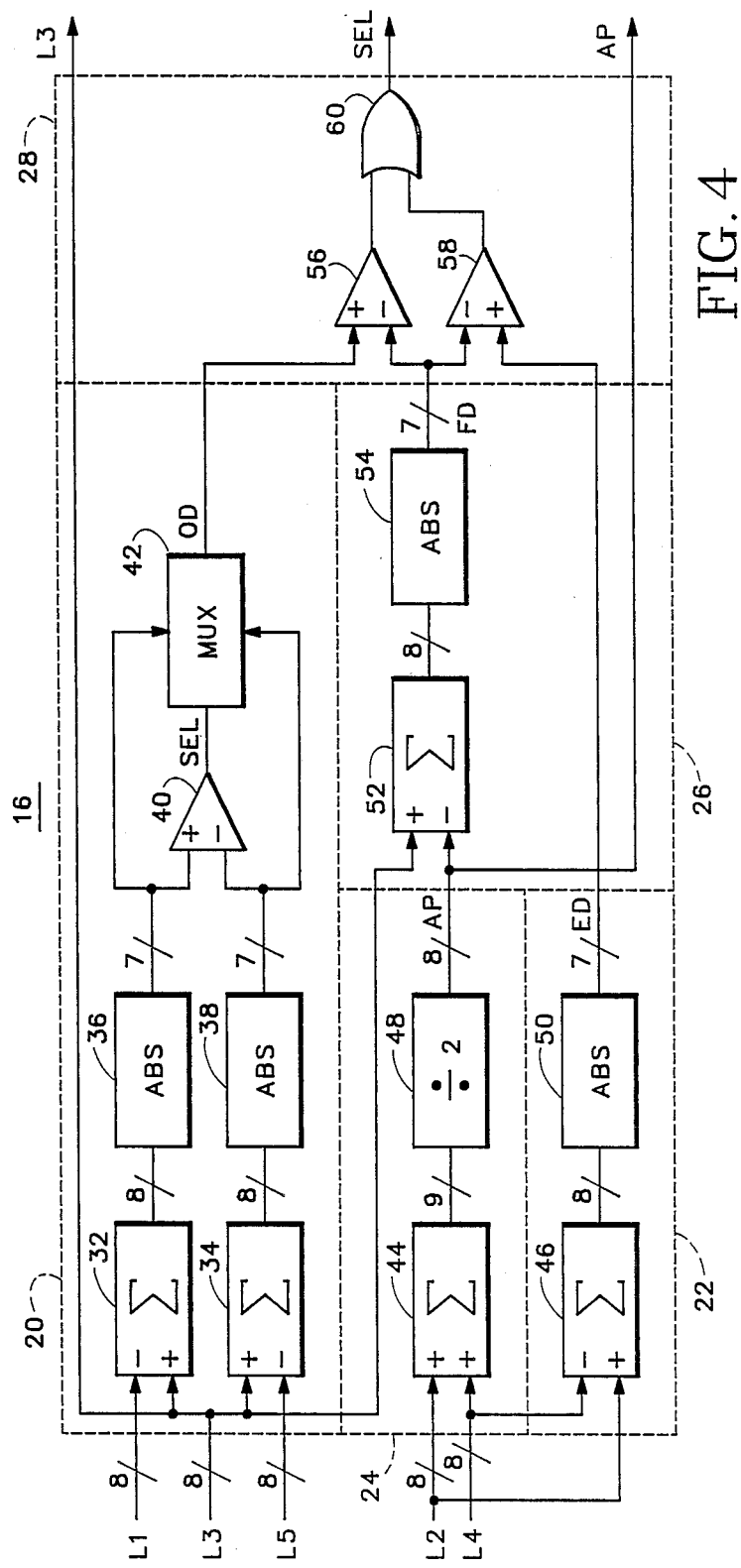
FIG. 4 is a more detailed block diagram of a portion of the system of FIG. 3.

The motion detector 16 is shown in greater detail in FIG. 4. The pixels L1, L3, L5 from the odd field are input to summing circuits 32, 34 so that the differences L3−LI and L3−L5 are produced. These differences are input to respective absolute value circuits 36, 38 to obtain an absolute value for each difference. The outputs of the absolute value circuits 36, 38 are input to a comparator 40 and to a select multiplexer 42. If |L3−L1| is greater than |L3−L5|, than the output of the comparator 40 provides a select signal to the select multiplexer 42 which outputs |L3−L5| as the odd difference value OD, and vice versa. The pixels L2, L4 from the even field are input to respective summing circuits 44, 46 to obtain, respectively, the sum and difference of the pixels. The sum of the pixels (L2+L4) is input to a divider 48 where the sum is divided by two to obtain the average of the two pixels AP. The difference of the pixels (L2−L4) is input to an absolute value circuit 50 to obtain the absolute value of the difference as the even field difference value ED. The AP and L3 values are input to another summing circuit 52 which obtains the difference (L3−AP), which difference is input to an absolute value circuit 54 to produce the difference between the even and odd fields FD. The OD, ED and FD outputs are input to comparators 56, 58 so that, if OD or ED is greater than or equal to FD, a "1" is output for that comparator. The outputs of the comparators 56, 58 are input to an OR gate 60 to provide the select signal for the motion multiplexer 30 such that if either or both outputs are "1" the original pixel value L3 is selected over the interpolated value AP.

The present technique is useful to convert pairs of fields into motion suppressed frames. Either the odd or even field is selected as being subject to change in order to eliminate motion and corresponding flicker from the resulting frame. Continuous processing of video in this manner is especially useful when transferring images to film since each pair of fields must be converted into a motion suppressed frame for exposure onto a film frame. Other applications include video frame rate doubling, generally accomplished within a television receiver. In this situation the current video field is always displayed unchanged, and the missing lines are filled in with pixels from the previous field or interpolated values from the current field based on motion detection according to this technique. Finally other applications which require accurate motion detection may use the present technique, such as for video noise reduction.

Thus the present invention provides a field motion suppression technique in interlaced video displays which preserves vertical resolution for stationary objects while detecting motion on a pixel by pixel basis without the use of a fixed threshold.

What is claimed is:

1. A method of generating a motion suppressed frame from two fields of interlaced video data comprising the steps of:
   determining for each pixel in one field a first field difference value and from adjacent vertical pixels in the other field a second field difference value;
   determining an alternative pixel value for each pixel from the adjacent vertical pixels in the other field;
   determining a field difference value for each pixel from the value for that pixel and the corresponding alternative pixel value; and
   replacing each pixel with the alternative pixel value when motion is detected for that pixel, the motion being detected as a function of the three field difference values, so that when the two fields are alternately displayed the motion suppressed frame is produced.

2. A method as recited in claim 1 further comprising initially selecting one field to be modified by motion detection on a pixel by pixel basis, the other field to be unaffected by motion detection.

3. A method as recited in claim 1 wherein the first field difference value determining step comprises the steps of:
   obtaining the absolute differences between each pixel of the one field and the pixel in the same field immediately above and below each pixel to form an upper field difference value and a lower field difference value; and selecting the lesser value from the upper and lower field difference values as the first field difference value.

4. A method as recited in claim 1 wherein the alternative pixel value determining step comprises the step of averaging the adjacent vertical pixels from the other field to produce the alternative pixel value.

5. A method as recited in claim 1 wherein the replacing step comprises the steps of:
comparing the first and second field difference values respectively with the field difference value; and
indicating motion when both the first and second field difference values are less than the field difference value so that when such motion is indicated the alternative pixel value replaces the pixel value in the one field.

6. An apparatus for generating a motion suppressed frame from two fields of interlaced video data comprising:
means for storing the two fields;
means for determining for each pixel in one of the two fields a first field difference value and from adjacent vertical pixels in the other field a second field difference value;
means for determining an alternative pixel value for each pixel in the one field from the adjacent vertical pixels in the other field;
means for determining a field difference value for each pixel in the one field from the pixel value for that pixel and the corresponding alternative pixel value;
means for replacing each pixel in the one field with the corresponding alternative pixel value when motion is detected for that pixel, the motion being detected as a function of the three field difference values, to produce the motion suppressed field; and
means for displaying the motion suppressed field with the other one of the two fields to produce the motion suppressed frame.

7. An apparatus as recited in claim 6 further comprising means for selecting the one field to be modified by the modifying means to produce the motion suppressed field.

8. An apparatus as recited in claim 6 wherein the first field difference value determining means comprises:
means for obtaining an absolute difference value between each pixel in the one field and the pixel in the same field immediately above and below that pixel to form an upper difference value and a lower difference value; and
means for selecting the lesser value from the upper and lower difference values as the first field difference value.

9. An apparatus as recited in claim 6 wherein the alternative pixel value determining means comprises means for averaging adjacent vertical pixels from the other field corresponding to each pixel in the one field to produce the alternative pixel value.

10. An apparatus as recited in claim 7 wherein the replacing means comprises:
means for comparing the first and second field difference values with the field difference value; and
means for indicating motion for each pixel in the one field when both the first and second field difference values are less than the field difference value corresponding to that pixel so that the alternative pixel value replaces the value of that pixel.

* * * * *